United States Patent [19]
Reuter et al.

[11] 3,927,113
[45] Dec. 16, 1975

[54] PROCESS FOR THE PREPARATION OF METHYLPHOSPHINE OXIDES

[75] Inventors: Martin Reuter, Kronberg, Taunus; Walter Rupp, Konigstein, Taunus, both of Germany

[73] Assignee: Hoechst Aktiengesellschaft, Frankfurt am Main, Germany

[22] Filed: Apr. 11, 1974

[21] Appl. No.: 460,153

[30] Foreign Application Priority Data

Nov. 16, 1973 Germany.............................. 2357276

[52] U.S. Cl............................................ 260/606.5 P
[51] Int. Cl.²....................................... C07D 105/02
[58] Field of Search.............................. 260/606.5 P

[56] References Cited
UNITED STATES PATENTS

| | | | |
|---|---|---|---|
| 3,291,840 | 12/1966 | Buckler et al. | 260/606.5 P |
| 3,293,302 | 12/1966 | Popoff et al. | 260/606.5 P |
| 3,477,953 | 11/1969 | Carlson | 260/606.5 P X |
| 3,660,495 | 5/1972 | Lin | 260/606.5 P |

OTHER PUBLICATIONS

Chemical Abstracts V. 70, 115227s, (1969), corresponds to Kamai et al., Lh. Obschch. Lkim., V. 39, (2), pp. 379–382, (1969).
Trippett, J. Chem. Soc. pp. 2813–2816, (1961).
Chemical Abstracts, V. 68, 39721$q$, (1968).
Chemical Abstracts, V. 66, 65626$r$, (1967).
Chemical Abstracts, V. 56, 1475$q$ and 6002$e$, (1962).
Chemical Abstracts, V. 70, 20112$m$, (1969).
Chemical Abstracts, V. 68, 87350$q$, (1968).

*Primary Examiner*—Helen M. S. Sneed
*Attorney, Agent, or Firm*—Curtis, Morris & Safford

[57] ABSTRACT

A process is provided for the catalytic preparation of tertiary methylphosphine oxides, which comprises mixing hydro-hydroxymethyl-alkylphosphines with at least 1 weight % of a carbon tetrahalide of the formula $C(Hal_1)(Hal_2)(Hal_3)$, $Hal_4$, where $Hal_1$ is fluorine, chlorine or bromine, and $Hal_2$, $Hal_3$ and $Hal_4$ each is chlorine or bromine, only three of the radicals $Hal_1$ to $Hal_4$ being the same at temperatures of from −10° to +120°C and, after completed reaction, isolating the methylphosphine oxide of formula (I) so obtained by distilling off the carbon tetrahalide.

14 Claims, No Drawings

PROCESS FOR THE PREPARATION OF METHYLPHOSPHINE OXIDES

Subject of our copending application Ser. No. 460,151 filed Apr. 11, 1974 (corresponding to German Patent Application No. P 23 19 043.4 filed in Germany on Apr. 14, 1973) is a process for the catalytic preparation of bis-(hydroxymethyl)-methylphosphine oxide, which comprises mixing tris-(hydroxymethyl)-phosphine with at least 1 weight % of carbon tetrachloride or carbon tetrabromide at temperatures of from −10° to +120°C, and, after completed reaction, isolating the bis-(hydroxymethyl)-methylphosphine oxide so obtained by distilling off the carbon tetrahalide and the solvent optionally used.

Subject of our copending application Ser. No. 460,133 filed Apr. 11, 1974 (corresponding to German Patent Application No. P 23 57 279.4 filed in Germany on Nov. 16, 1973) is a process for the catalytic preparation of methylphosphine oxides of the formula (I)

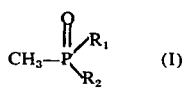

where $R_1$ is an alkyl radical unsubstituted or substituted by inert groups and having from 1 to 20 carbon atoms, and $R_2$ is an alkyl radical as defined for $R_1$ or a $-CH_2OH$ group, which comprises mixing a hydroxy-methyl-alkylphosphine of the formula II

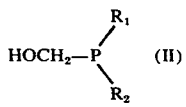

where $R_1$ and $R_2$ are as defined above, with at least 1 weight % of carbon tetrachloride or carbon tetrabromide at a temperature of from −10° to +120°C, and, after the reaction is complete, isolating the tertiary methylphosphine oxide of formula (I) obtained by distilling off the carbon tetrahalide and the solvent optionally used.

It was known to prepare bis-hydroxymethyl-methylphosphine oxide by oxidizing bis-hydroxymethyl-methylphosphine with hydrogen peroxide to form phosphine oxide according to usual methods; the bis-hydroxymethyl-methylphosphine being prepared from tris-hydroxymethyl phosphine by addition of methyl iodide and degradation of the tris-hydroxymethyl-methylphosphonium iodide with triethylamine according to the following reaction scheme:

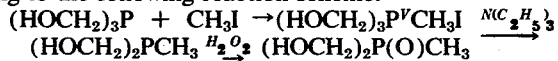

(see E. I. Grinstein, Chem. Abstracts, Vol.56, pp. 1475 and 6002, USSR Pat. No. 138,618, furthermore R. K. Valetchinov, Chem. Abstracts, Vol. 68, p. 8428).

However, the triethylamine degradation of tris-hydroxy-methyl-methylphosphonium iodide proceeds with only poor yields, and there is a great expenditure in chemicals which are lost in the end.

G. Ch. Kamaj et al. (J. obsc. chimii, Vol. 39 (1969), pp. 379 to 382) describe tests according to which tri-(oxymethyl)-phosphine and carbon tetrachloride do not react with each other even when they are heated to boiling temperature.

In modification of our copending applications, Ser. Nos. 460,151 and 460,133 a process has now been found for the catalytic preparation of methylphosphine oxides of the formula (I)

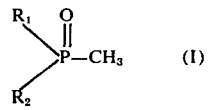

where $R_1$ and $R_2$ are alkyl groups having from 1 to 20, preferably from 1 to 4, especially 1 or 2 carbon atoms, which may be substituted, preferably monosubstituted, especially in ω-position, by groups inert under the reaction conditions such as $-CN$, $-OR_3$ ($R_3$ being an alkyl group having up to 10, preferably from 1 to 4, especially 1 or 2 carbon atoms), halogen, especially fluorine and/or chlorine; or $R_1$ and $R_2$ each is the $-CH_2OH$ group; which process comprises mixing a hydroxymethylphosphine of the formula (II)

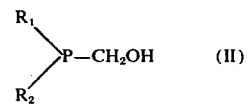

where $R_1$ and $R_2$ are as defined above, with at least 1 weight % of a carbon tetrahalide of the formula (III)

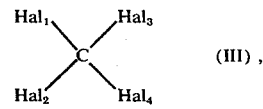

where $Hal_1$ is fluorine, chlorine or bromine, and $Hal_2$, $Hal_3$ and $Hal_4$ each is chlorine or bromine, only three of the radicals $Hal_1$ to $Hal_4$ being the same at temperatures of from −10° to +120°C, optionally with addition of inert solvents, and, after completed reaction, isolating the methylphosphine oxide of formula (I) so obtained by distilling off the carbon tetrahalide and the solvent optionally used.

In formula (II), $R_1$ and $R_2$ may for example be methyl, ethyl, butyl, octyl, dodecyl, eicosyl, methoxymethyl, ethoxymethyl, 2-ethoxyethyl, 1-ethoxyethyl, 2-methoxypropyl, 3-ethoxypropyl, 4-butoxybutyl, 2-cyano-ethyl, 3-cyanopropyl, chloromethyl, 2-chloroethyl or 3-chloropropyl. $R_1$ is preferably $-CH_2OH$, and $R_2$ is preferably $-CH_3$, $-CH_2OH$ or $-CH_2CH_2CN$. Preferred compounds of formula (II) are those where at least one of the radicals $R_1$ or $R_2$ or both are $-CH_2OH$.

As catalysts of formula (III) used according to the present invention, there are for example used mixed halogen substituted carbon tetra-halides such as $CFBr_3$, $CFBr_2Cl$, $CFBrCl_2$ or, preferably, $CBrCl_3$ and, in the case where the operations are to be carried out under pressure, also $CFCl_3$. Chlorine or bromine is preferred for $Hal_1$. Preferred compounds are $CBr_3Cl$, $CBr_2Cl_2$, and especially $CBrCl_3$.

The reaction according to the present invention proceeds at temperatures of from −10° to +120°C. Preferred are temperatures of from 5° to 80°C, especially from 20° to 70°C, and the exclusion of water and alcohols.

Since the reaction, which is a rearrangement of an oxygen atom from a —CH$_2$OH group to the P-atom according to the following scheme

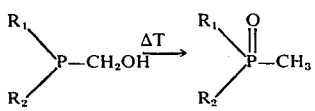

is exothermal, it is advantageous to operate with dilution in the presence of an inert organic solvent or suspension agent. Such diluents are for example benzene, octane, dimethyl formamide, benzonitrile, tetramethyl urea, methylene chloride, chloroform, chlorobenzene, ethers such as diisopropyl ether, esters such as ethyl acetate, or mixtures of these diluents. Preferably, a diluent is chosen the boiling point of which is the same as the desired reaction temperature. Relative to the hydroxymethylphosphine of formula (II) used, from 1/3 to 10-fold, preferably from 1 to 4-fold, weight amounts of diluent are added. When no diluent is used, temperatures of from 5° to 30°C are preferred.

The amount of carbon tetrahalide of formula (III) catalyzing the rearrangement of the hydroxymethylphosphine of formula (II) should be at least 1 weight %, relative to the phosphine employed. The upper limit is not critical, and the catalyst itself may also serve as diluent. Generally, from 10 to 2000 weight %, preferably from 20 to 1000 weight %, of carbon tetrahalide are used, relative to the phosphine employed. When less than 100 weight % are used, the addition of one of the above diluents (from 100 to 1000 weight %) is preferred. The reaction time, depending on the reaction conditions, is from about 0.1 to 80 hours. Advantageously, the reaction is carried out with exclusion of oxygen. Generally, the catalyst amounts are smaller and the reaction times shorter the more the temperature is elevated.

Work-up is carried out in known manner after cooling of the reaction batch by distilling off the catalyst and the diluent, and, optionally, further purification of the crude product by recrystallization, for example from dimethyl formamide or ethanol.

For example, the bis-(hydroxymethyl)-methylphosphine oxide obtained from tris-(hydroxymethyl)-phosphine according to the present invention, just as a comparative sample prepared according to the method of E. I. Grinstein, is a colorless hygroscopic solid having a melting point of about 70°C (mixed melting point with the product according to Grinstein showing no depression) which is easily soluble in hydrophilic solvents such as lower alcohols, glycol or dimethyl formamide, but insoluble in lipophilic solvents such as chloroform, ethyl acetate or dioxan. The bis-phenyl-urethane (C$_6$H$_5$NHCO$_2$CH$_2$)$_2$P(O)CH$_3$obtained by addition of 2 mols of phenyl isocyanate has a melting point of 172°C when it is recrystallized from ethanol, just as a comparative sample from the product prepared according to E. I. Grinstein; the mixed melting point does not shown any depression also in this case.

The NMR spectrum in D$_2$O shows a doublet for the methyl protons at δ = 1.4 ppm and 1.7 ppm, a doublet for the methylene protons at 4.0 and 4.1 ppm, and a singlet for the OH protons at 4.7 ppm, relative to tetramethyl-silane.

The IR spectrum as in the case of OP(CH$_2$OH)$_3$, shows the intense PO band at 1140 cm$^{-1}$, an intense PC band at 1100 cm$^{-1}$, an intense OH band at 3300 cm$^{-1}$, and, additionally, intense characteristic bands at 900 and 925 cm$^{-1}$.

The tertiary methylphosphine oxides obtained in accordance with the present invention may be applied to the manufacture of flameproof polyurethanes, and as intermediate products for syntheses especially of flameproofing or plant protection agents.

The following example illustrates the invention.

EXAMPLE

Ethyl-methyl-hydroxymethylphosphine Oxide 12 g (0.1 mol) of ethyl-bis-hydroxymethylphosphine were stirred with 30 cm$^3$of toluene under a nitrogen atmosphere, and subsequently a solution of 2 g (0.01 mol) of bromo-trichloromethane in 3 cm$^3$ of toluene was added dropwise. The two-phase mixture heated with agitation to reach 100°C and was refluxed for a further 6 hours at 110°C. The organo-phosphorus compound being the lower phase was separated, freed from residual toluene at 80°C under reduced pressure, and it yielded 11 g of a colorless oil which, contrary to the starting compound, did not decolorize an iodinepotassium iodide solution in an aqueous hydrochloric acid solution, that is, it contained no trivalent phosphorus. The yield of ethyl-methyl-hydroxymethylphosphine oxide evaluated by gas chromatography was 80 % of the thoretical yield. The determination was carried out using the product silylated with N,O--bis-trimethylsilyl-acetamide.

For purification, the crude product was fractionated under highly reduced pressure, the main part = 7 g passing over as colorless oil at 161°–163°C/0.1 torr (mm.Hg), which oil did not solidify even at 0°C. The gas chromatogram after silylation with N,O-bis-trimethylsilyl-acetamide showed 93 % at an elution temperature of 157°C, and 2 % at an elution temperature of 175°C; the infrared spectrum contained the same bands as (CH$_3$)$_2$P(O)CH$_2$OH, that is, the very intense PO band at 1140 cm$^{-1}$, an intense PC band at 1050 cm$^{-1}$, an intense OH band at 3200 cm$^{-1}$, and an intense characteristic band at 940 cm$^{-1}$. The NMR spectrum in D$_2$O as in the case of the ethyl-bis-hydroxymethylphosphine contained a doublet for the methyl protons at 3.9 and 4.0 ppm, although being less intense, a singlet for the OH protons at 4.8 ppm, also being less intense, the same for the protones of the C$_2$H$_5$ group, an about 10-band spectrum at 0.9–2.0 ppm, but additionally an intense doublet at 1.4 and 1.7 ppm, analogous to the methyl doublet of (CH$_3$)$_2$P(O)CH$_2$OH, although of less intensity, all relative to tetramethyl-silane.

Thus, the reaction product obtained was identified as being the hitherto unknown ethyl-methyl-hydroxymethylphosphine oxide C$_2$H$_5$(CH$_3$)P(O)CH$_2$OH. It was easily soluble in water with a weakly acidic reaction (pH 3.6), and also in dimethyl formamide, chloroform, ethanol and acetone, and insoluble in benzene and ethyl acetate.

Elementary analysis: Calculated: C, 39.3 %; H, 9.0 %; P, 25.4 %, found: C, 38.2 %; H, Found: %; P, 24.8 %.

What is claimed is:

1. A process for the preparation of methyl phosphine oxide of the formula

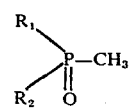

wherein $R_1$ and $R_2$ each is alkyl having up to 20 carbon atoms, alkyl having up to 20 carbon atoms and substituted by a group inert under the conditions of the process, or —$CH_2OH$, which comprises contacting a hydroxymethyl-phosphine of the formula

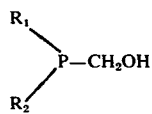

with at least about 1% by weight of a carbon tetrahalide of the formula

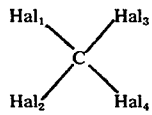

wherein $Hal_1$ is fluorine, chlorine or bromine, $Hal_2$, $Hal_3$ and $Hal_4$ each is chlorine or bromine and only three of $Hal_1$ to $Hal_4$ are the same, at a temperature between about $-10°$ and about $120°C$. substantially in the absence of oxygen, water and alcohol, and after reaction distilling off said carbon tetrahalide to isolate said methyl phosphine oxide, the percent being based on the weight of said hydroxymethyl-phosphine.

2. A process according to claim 1 wherein the reaction is conducted under an atmosphere of nitrogen and in an anhydrous and nonalcoholic medium.

3. A process according to claim 1 wherein from about 10% to about 2000% of said carbon tetrahalide is used.

4. A process according to claim 1 wherein from about 20% to about 1000% of said carbon tetrahalide is used.

5. A process according to claim 1 wherein the reactants are in an inert solvent, and said inert solvent is distilled off with said carbon tetrahalide.

6. A process according to claim 5 wherein said inert solvent is used in an amount of from about one-third to about 10 times the amount of said phosphine.

7. A process according to claim 1 wherein said temperature is between about 5° and about 80°C.

8. A process according to claim 1 wherein said temperature is between about 20° and about 70°.

9. A process according to claim 5 wherein up to about 100% of said carbon tetrahalide and from about 100% to about 1000% of said solvent are used.

10. A process according to claim 1 wherein said alkyl has 1 to 4 carbon atoms.

11. A process according to claim 1 wherein said inert group is —CN, halogen or —$OR_3$ wherein $R_3$ is alkyl of up to 10 carbon atoms.

12. A process according to claim 1 wherein said inert group is cyano, lower alkoxy, fluorine or chlorine.

13. A process according to claim 1 wherein said $R_1$ is hydroxymethyl and $R_2$ is methyl, hydroxymethyl or β-cyanoethyl.

14. A process according to claim 1 wherein said carbon tetrahalide is $CBr_3Cl$, $CBr_2Cl_2$ or $CBrCl_3$.

* * * * *